United States Patent [19]

Wright

[11] Patent Number: 4,732,468

[45] Date of Patent: Mar. 22, 1988

[54] REGISTRY DEVICE FOR TRANSPARENCIES FOR OVERHEAD PROJECTOR

[76] Inventor: John S. Wright, 6115 N. Lake Drive Ct., Milwaukee, Wis. 53217

[21] Appl. No.: 880,723

[22] Filed: Jul. 1, 1986

[51] Int. Cl.⁴ .............................................. G03B 21/54
[52] U.S. Cl. .................... 353/120; 353/122; 353/DIG. 5
[58] Field of Search .............. 353/120, 122, DIG. 3, 353/DIG. 5; 40/361, 158 R, 158 B, 152; 307/400; 248/205.1, 208, 359 R, 359 A; 156/71, 273.1

[56] References Cited

U.S. PATENT DOCUMENTS

| | | | |
|---|---|---|---|
| 3,253,358 | 5/1966 | Wright | 40/106.1 |
| 3,522,673 | 8/1970 | Dudley | 40/158 R |
| 3,524,703 | 8/1970 | Wright | 353/35 |
| 3,609,026 | 9/1971 | Verebay | 353/120 |
| 3,642,359 | 2/1972 | Kitch | 353/32 |
| 3,661,449 | 5/1972 | Wright | 353/88 |
| 3,709,590 | 1/1973 | Bisberg | 353/120 |
| 3,895,453 | 7/1975 | Wright | 40/102 |
| 4,156,978 | 6/1979 | Swift et al. | 40/361 |
| 4,203,659 | 5/1980 | Constantine et al. | 353/DIG. 5 |
| 4,225,369 | 9/1980 | Felchlin | 156/71 |
| 4,275,112 | 6/1981 | Savage, Jr. | 307/400 |
| 4,402,585 | 9/1983 | Gardlund | 353/DIG. 5 |
| 4,498,746 | 2/1985 | Wright | 353/120 |
| 4,608,109 | 8/1986 | Pook | 248/359 |

FOREIGN PATENT DOCUMENTS

| | | | |
|---|---|---|---|
| 2700508 | 7/1978 | Fed. Rep. of Germany | 353/DIG. 5 |
| 2156096 | 10/1985 | United Kingdom | 353/DIG. 3 |

*Primary Examiner*—Charles Frankfort
*Assistant Examiner*—Patrick R. Scanlon
*Attorney, Agent, or Firm*—Quarles & Brady

[57] ABSTRACT

A registry device for transparencies for an overhead projector comprises a backbone with at least two projections for entering openings in a transparency to prevent it from moving; and, an adhesive-free anchoring sheet of plastic attached to the backbone. The anchoring sheet being of a material that will cling to the glass stage of a projector and prevent the registry device from sliding or being moved until the anchoring sheet is lifted from the glass. In a preferred embodiment a framing sheet also is attached to the backbone.

2 Claims, 4 Drawing Figures

REGISTRY DEVICE FOR TRANSPARENCIES FOR OVERHEAD PROJECTOR

FIELD OF THE INVENTION

The present invention relates generally to overhead projectors. More particularly, it relates to a registry device for properly aligning transparencies on an overhead projector.

BACKGROUND OF THE INVENTION

Overhead projectors are widely used for the presentation of educational and commerical material. Such projectors comprise a transparent glass stage, a light source below the stage and a reflector above the stage which projects images received from the stage onto a screen. The images to be projected are usually printed or drawn on transparent plastic sheets, referred to as transparencies or slides. The transparent glass stage on which the transparencies are placed is usually a square $10'' \times 10''$ or $11'' \times 11''$ upon which a transparency, usually $8\frac{1}{2} \times 11$, can be positioned and projected either vertically or horizontally. So that the stage can be as versatile as possible it is usually not provided with any registry means which are used to insure proper positioning of the transparencies on the stage or any means of framing the transparency to avoid the projection of extraneous material or light.

In the past, a number of suppliers have provided their transparencies in the form of books or packs with registry means and/or framing means. However, because of the added cost of such books or packs the suppliers of overhead transparencies have increasingly taken to simply supplying the transparencies in a conventional three-ring binder without any registry means or framing means. As a result, if the user of an overhead projector wants to insure that the transparency is properly aligned or two or more overlaid transparencies are in register, he has to devise his own registry means for keeping slides properly aligned or framing means so that extraneous light or material is not projected. Some users have used masking tape to secure the transparency in place, but obviously each time a transparency is replaced, the tape has to be lifted and reapplied. To prevent the extraneous material light from coming through, some users have used wide tape to both secure and frame the transparencies or put the transparencies into cardboard frames. However, the latter is a relatively expensive process when a large number of transparencies are involved.

Obviously, it would be advantageous to have a simple inexpensive device that would permit the user to both properly align transparencies supplied in three-ring binders on the glass stage of a projector and to frame the transparencies, if desired.

SUMMARY OF THE PRESENT INVENTION

It is an object of the present invention to disclose a simple, inexpensive registry device for the proper alignment and location of one or more transparencies on the stage of an overhead projector.

It is yet another object of the present invention to provide a registry device which also includes a simple framing means for preventing extraneous material and light from being projected.

It is yet another object of the present invention to provide a convenient, inexpensive registry and framing device for overhead transparencies which can be stored in a three-ring binder along with the transparencies.

It is a further object to provide a registry device that can be easily attached to the glass stage of an overhead projector without the use of adhesives or weights.

The registry device of the present invention comprises a backbone having registering means for entering into and coacting with openings in one or more transparencies to hold the transparencies in a desired position and an adhesivefree, lightweight anchoring means attached to the backbone for securing the registry device on the glass stage of a projector.

The backbone is a relatively rigid member which lays flat on the glass stage and maintains the registering means in the proper relationship for coacting with the openings in the transparencies. The registering means on the backbone are preferably three upright projections which are aligned and sized to fit within with the ring binder openings in the transparencies. The projectios are preferably tall enough so that a number of transparencies can be placed upon them so that one transparency will properly overlie another.

The anchoring means which is attached to the backbone is an adhesive-free, flexible, opaque plastic sheet which when pressed into contact with the glass stage will adhere or cling to the glass and prevent the registry device from being moved until the sheet is manually lifted from the glass stage. The preferred anchoring means is a sheet of polyvinyl chloride polymer film which is soft and smooth enough so that when it is pressed against the smooth glass most of the air will be excluded from between the plastic sheet and the glass surface and the plastic sheet will cling to the glass and prevent the registry device from being moved until the anchoring sheet is lifted from the glass. Alternatively, a lay flat plastic sheet can be used as the anchoring means which has an electrical charge which attracts it to the glass and thus prevents the registry device from being moved.

In an especially preferred embodiment of the invention, there also is attached to the backbone a framing means comprising a second plastic sheet which is transparent except for an opaque border. The second sheet is sized so that the transparent area within the border permits all the desired material from the slide to be projected and the opaque border prevents the projection of extraneous material and light which could distract from or interfere with the viewer's interest. The framing means plus the anchoring means and the backbone completely cover the glass stage. The anchoring sheet and the framing sheet extend from the backbone in opposite directions.

DESCRIPTION OF THE PREFERRED EMBODIMENT

Figure 1:
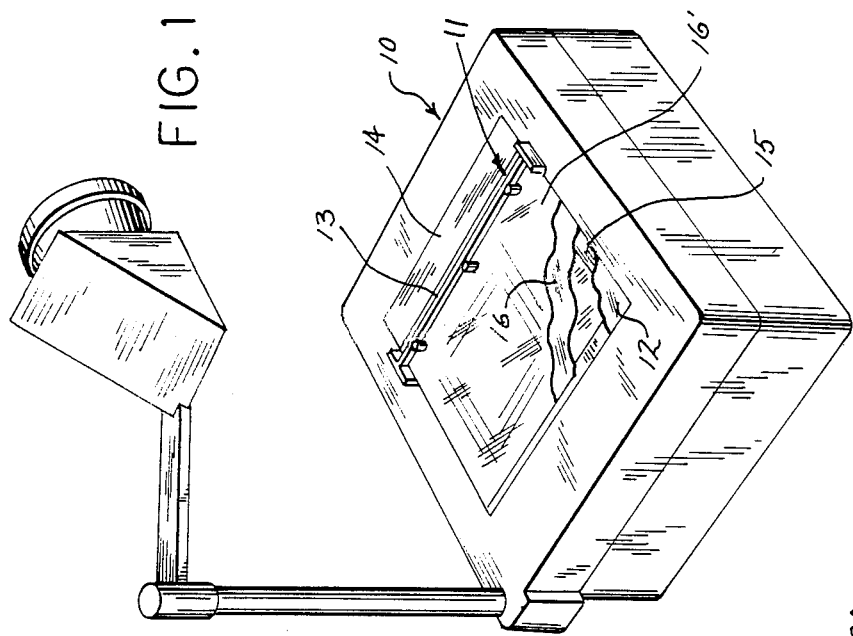
FIG. 1 is a perspective view showing the preferred embodiment of the registry device of the present invention and a pair of transparencies in place on an overhead projector.
Figure 2:
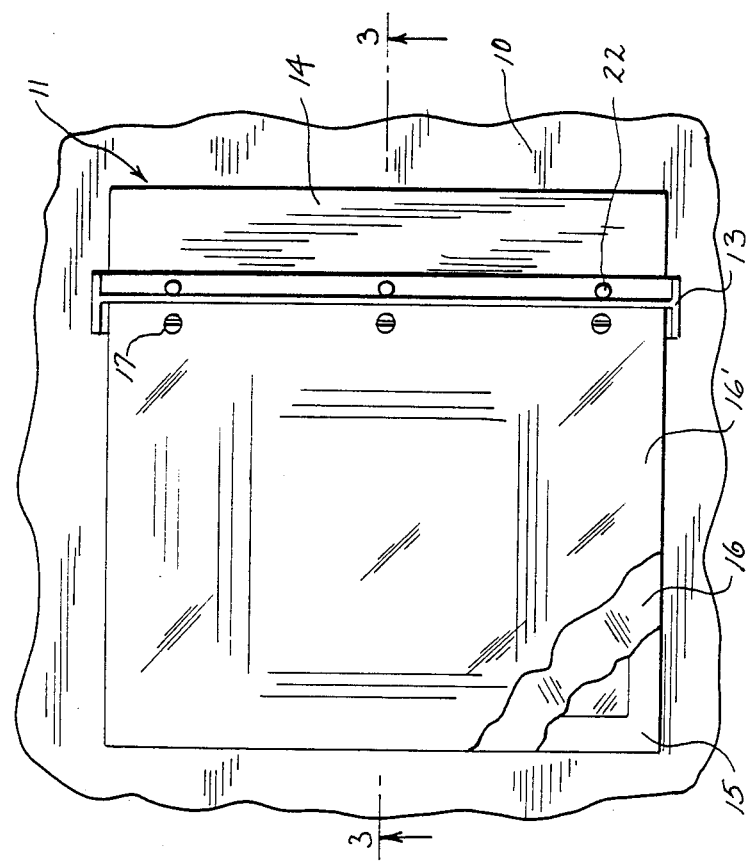
FIG. 2 is an enlarged top elevational view of the device of FIG. 1.
Figure 3:
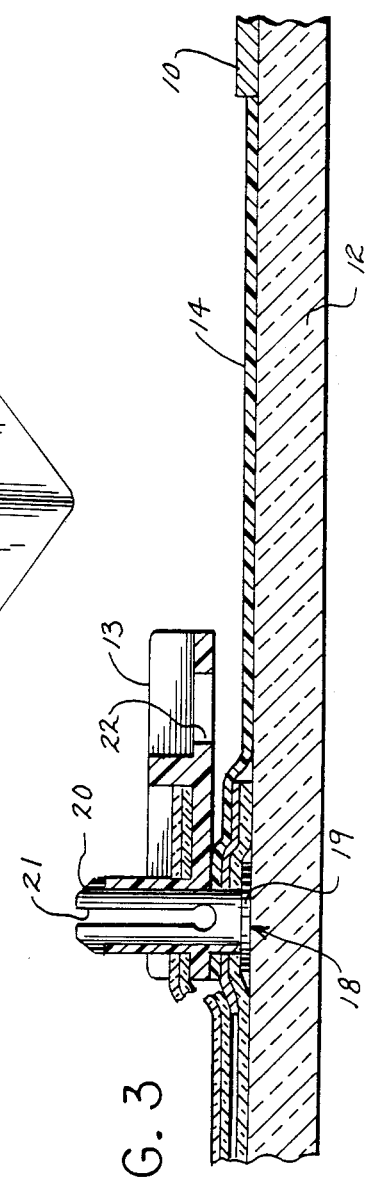
FIG. 3 is a view taken along lines 3—3 in FIG. 2.

Referring to FIGS. 1 to 3, an overhead projector 10 can be seen with a registry device 11 of the present invention positioned upon the projection glass stage 12 (seen best in FIG. 3). As seen therein, the registry device 11 includes a relatively regid backbone 13, an anchoring sheet 14 and a framing sheet 15. There also is seen a pair of transparencies 16 and 16'.

Figure 4:
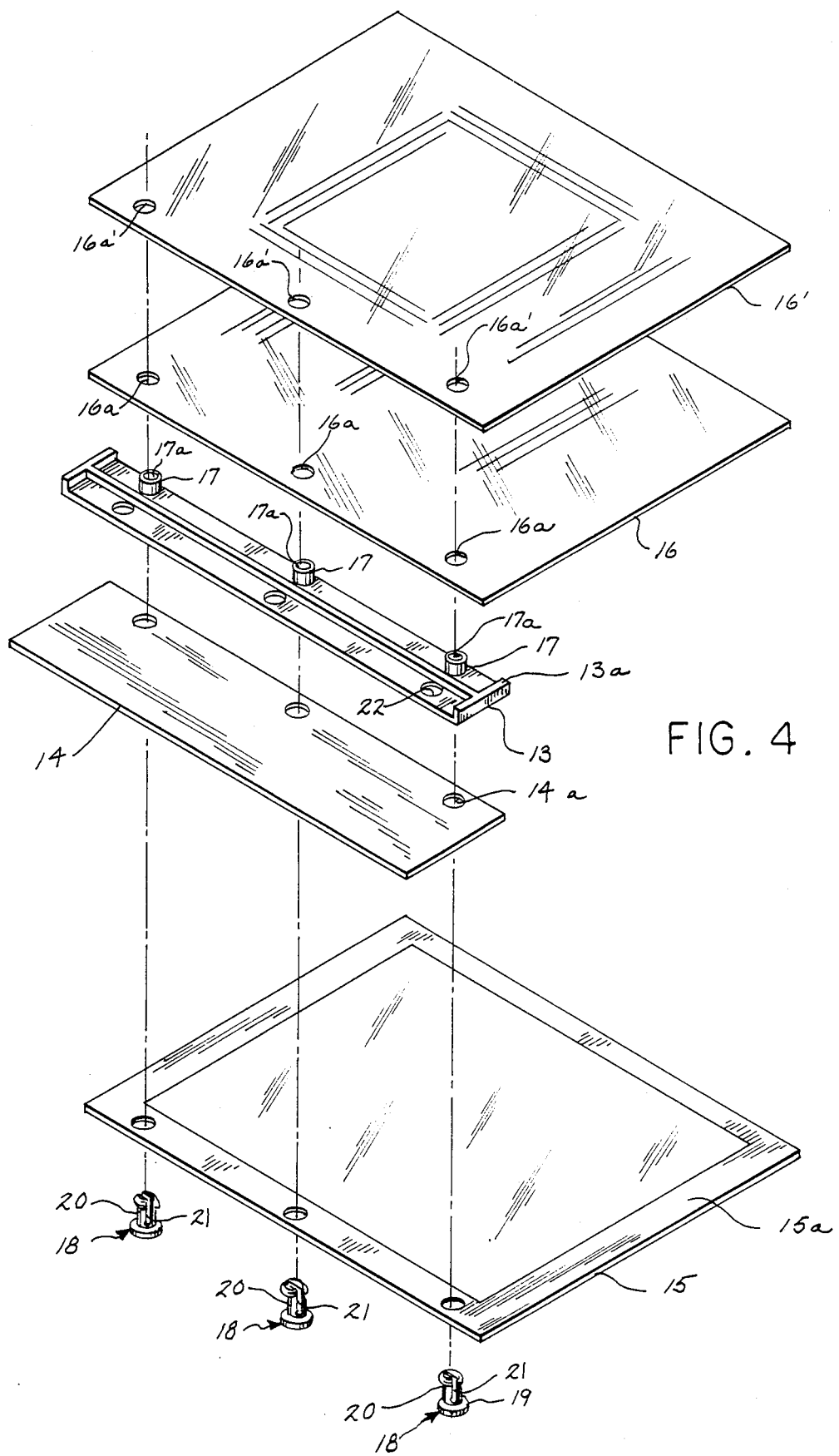
FIG. 4 is an exploded elevational view showing the various components of the registry device of FIG. 1 and the pair of transparencies.

Turning to FIG. 4, the components of the preferred device of the present invention can be seen aligned for assembly. The backbone 13 has three upwardly directed projections 17 which are spaced apart, aligned and sized to fit within the openings 16a and 16'a of the transparencies 16 and 16' respectively. The openings 16a and 16'a are sized and spaced apart to permit the transparencies to be bound in a three-ring binder (not shown). The anchoring sheet 14 and the framing sheet 15 are positioned below and the backbone 13 and can be attached thereto by pins 18 which are adapted to extend through the openings 14a and 15a in the anchoring sheet and the framing sheet, respectively, and into the bores 17a of cylindrical projections 17 on the backbone 13.

Referring to FIG. 3, it is seen that the pins 18 have an enlarged head 19 and the main body 20 which has a slot 21. The slot 21 permits the main body 20 to be radially compressed so that the pin can be easily inserted into the bore 17a. Once the compressing force is released the main body 20 expands to retain the pin 18 in the bore 17a of the projection 17. As a result, the anchoring sheet 14 and the framing sheet 15 may be securely attached to the backbone 13.

As seen best in FIGS. 2 to 4, the backbone 13 also includes on the side opposite the projections 17, openings 22 which are sized and spaced apart to accept and receive the rings of a three-ring binder so that the registry device 10 can be conveniently stored in a three-ring binder along with the transparencies if desired.

The backbone 13 can be made of any suitably rigid material, including metal. However, it is preferred to mold it of plastic in which case a reinforcing rib 13a may be molded in place along with the projections 17 and the openings 22. Neither the material nor the exact shape of the backbone 13 are of critical importance so long as the backbone 13 serves its functional purpose which is to carry the projection 17 or other registering means and to be rigid enough so that registering the transparencies placed thereon will be properly aligned and lay flat on the stage.

The anchoring sheet 14 is preferably of cast polyvinyl chloride polymer film. The preferred material is smooth, glove-soft and either opaque or transparent film coated to be opaque. When the smooth, soft, polyvinyl chloride polymer sheet is pressed against the smooth glass of the overhead projector stage, all the air between the smooth polyvinyl sheet and the glass is excluded and the plastic sheet adheres or clings to the glass with a bond strength which makes the use of adhesives unnecessary. Cast film is preferred because of its smoothness; extruded film is usually too rough to be used. In place of the preferred polyvinyl chloride polymer film, any material that performs the same function can be used, as well as, materials which possess or will possess a charge which attracts them to the glass of the stage and causes them to cling securely thereto. If desired, the instructions for using the registry device can be printed on the anchoring sheet for easy reference.

The framing sheet 15 also may take various forms so long as at least the central portion will not interfere with the projection of the material on the transparency. The opaque border 15b can be printed on the sheet or if desired, a frame as can be made of tape. In the preferred embodiment the framing sheet is of polyester polymer which is scratch resistant, highly transparent, lightweight and flexible; it also does not cling and lays flat on the glass stage. The framing sheet also could be of polyvinyl or similar material which adheres to the glass material of the projector stage. However, it is not necessary to have a framing sheet that clings to the surface of the glass because the anchoring function is performed adequately by the anchoring sheet. Both the anchoring sheet and framing sheet functions also could be supplied by a single sheet of polyvinyl with the framing portion clear coated on the projection side so it does not cling. If the projection of extraneous material and light is not important, the framing means need not be included.

It will be readily apparent to those skilled in the art that the registry device of the present invention provides a convenient, inexpensive, means of aligning transparencies on a projector stage and that it will be particularly useful to users who obtain transparencies which are supplied in ordinary ring binders.

It will be readily apparent to those skilled in the art that a variety of changes and modifications can be made without departing from the spirit and scope of the present invention. Therefore, it is intended that the invention not be limited except by the claims which follow.

What is claimed is:

1. A registry device for properly aligning one or more transparencies on the glass stage of an overhead projector, which transparencies have spaced apart openings along one side so the transparencies can be stored in a ring binder, said device comprising a relatively rigid backbone having registering means for entering at least two of the spaced-apart openings of such a transparency and holding said transparency in a desired position on the stage; an adhesive-free, lightweight, anchoring means attached to the backbone for securing the registry device on the glass stage, said anchoring means serving as the sole means of securing the device to the glass stage and comprising a plastic sheet which when pressed flat upon the glass stage will securely cling to the glass stage and prevent the registry device from being moved until the sheet is lifted from the glass stage; and framing means comprising a second plastic sheet which is attached at one end to the backbone and which extends in an opposite direction from the first sheet, said second sheet having at least a portion thereof which is transparent; said registering means comprising pins which extend through aligned openings in the rigid backbone, anchoring means and framing means and which serve to unite them into a unitary device.

2. A registry device of claim 1 in which the relatively rigid backbone includes spaced-apart openings so that the device can be stored in a ring binder.

* * * * *